Oct. 29, 1929.  C. C. FARMER  1,733,188
RETAINING VALVE DEVICE
Filed April 3, 1928
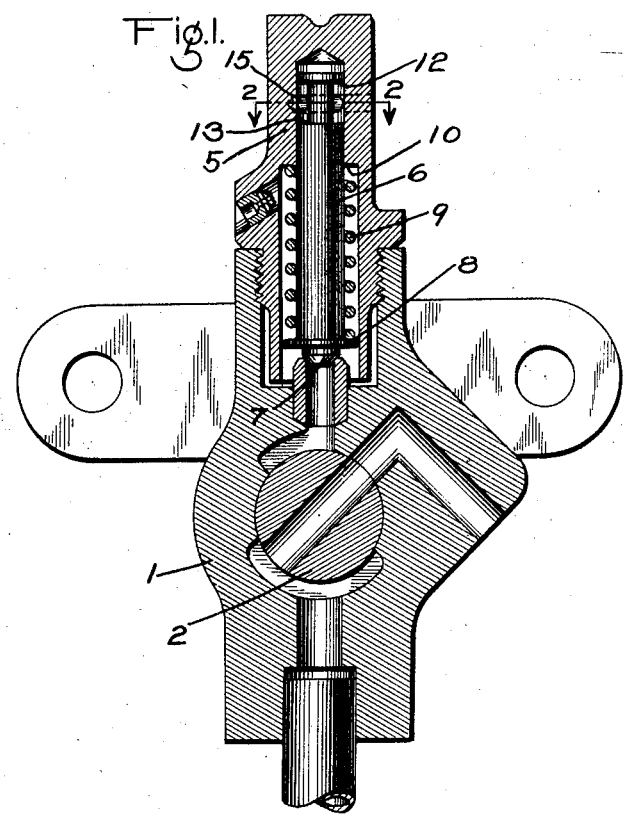
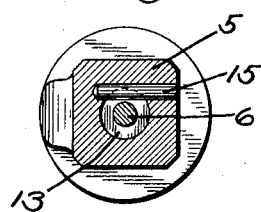
INVENTOR
CLYDE C. FARMER
BY *Wm. M. Cady*
ATTORNEY Patented Oct. 29, 1929

1,733,188

UNITED STATES PATENT OFFICE

CLYDE C. FARMER, OF PITTSBURGH, PENNSYLVANIA, ASSIGNOR TO THE WESTING-HOUSE AIR BRAKE COMPANY, OF WILMERDING, PENNSYLVANIA, A CORPORATION OF PENNSYLVANIA

RETAINING-VALVE DEVICE

Application filed April 3, 1928. Serial No. 266,943.

This invention relates to retaining valve devices of the type employed on railway cars for retaining fluid under pressure in the brake cylinder.

The retaining valve device heretofore employed comprises a body portion containing a retaining valve, a coil spring acting on the retaining valve and a cap nut having screw-threaded engagement with the body portion and adapted to hold the spring under compression. In this construction there is fixed to the cap nut a stud which serves as a guide for the spring. This method of guiding the spring has been found to be objectionable in that the spring, when it is being compressed during the opening movement of the valve, is liable to distort to such an extent that the coils thereof will frictionally engage the stud and thus modify the pressure of the spring and affect the proper operation of the valve. When the spring is thus distorted, or when the ends of the spring are not perfectly formed, the pressure of the spring may not be evenly applied to the valve collar, so that there will be a tendency for the guide portion of the valve to bind in the central bore of the valve seat member which would, of course, prevent the proper operation of the valve.

With this construction, when the cap nut is removed, in order to clean the valve seat and to permit refitting of the valve and seat, the spring is exposed and free, and in this condition, is liable to be stretched or compressed by the operator before it is replaced, thereby changing the desired pressure value thereof.

As disclosed in United States Letters Patent No. 1,626,618, issued May 3, 1927, in the name of F. P. Livingston, it has been proposed to prevent the separation of the retaining spring from a barrel section and thus guard the spring from damage, but when the barrel of this construction is removed from the body of the valve, a considerable portion of the spring will be exposed, and of course, in this exposed condition, is liable to damage. In this construction it would of course be an easy matter to remove the cap nut, force the valve stem outwardly and then drive out the pin which locks a guide nut on the valve stem and when this pin and nut are removed the several parts may be separated and are thus liable to damage. A further objectionable feature of this retaining valve device is that it is expensive to manufacture.

The principal object of my invention is to provide an improved pressure retaining valve device which is of simple construction, cheap to manufacture and efficient in operation, and which will be free from the objectionable features of the hereinbefore referred to retaining valve devices.

A more specific object of my invention is to provide a pressure retaining valve device in which the retaining valve is readily accessible for cleaning purposes and in which the construction is such that the retaining spring cannot be tampered with.

Other objects and advantages will appear from the following more detailed description of my invention.

In the accompanying drawing; Fig. 1 is a central sectional view of a retaining valve device embodying my invention; and Fig. 2 is a sectional view of a portion of a retaining valve device taken on the line 2—2 of Fig. 1.

As shown in the drawing, the retaining valve device may comprise the usual body portion 1 having mounted therein a plug valve 2, adapted to be operated by the usual handle (not shown).

Secured to the body portion 1, through the medium of screw-threads, is a barrel section 5 having a bore through which a valve stem 6 extends, the lower end of said stem being provided with a valve 7. Above the valve 7 the stem is provided with an annular collar 8 upon which the lower end of a retaining spring 9 seats, the upper end of the spring seating on an annular shoulder 10 formed interiorly of the barrel, near its upper end. Above the shoulder 10, the stem 6 is guided in the bore of the barrel 5. The inside diameter of the spring 9, which surrounds the stem 6, is slightly greater than the diameter of the stem, and due to this, buckling of the spring is prevented. The diameter of the collar 8 is slightly less than the greatest diameter of the bore of the barrel 5 so that when the valve is operated, any sidewise movement of the valve and stem will be limited by the collar engaging the wall of the bore. As the outside diameter of the spring is less than the diameter of the collar 8 and is guided by the stem itself, the spring will be prevented from frictionally engaging the wall of the bore, thus ensuring a uniform pressure of the spring at all times.

It will be noted from an inspection of Fig. 1 of the drawing that a slight clearance has been shown between the collar and the wall of the bore, which clearance is sufficient to permit the free operation of the valve and is not great enough to permit the valve and stem to be moved sidewise far enough that the valve will not properly enter its seat opening.

As the spring is guided by the stem 6, and as the collar 8 prevents undue sidewise movement of the stem, the pressure of the spring 9 which may have imperfectly formed ends will not cause misalignment of the valve with its seat to such an extent that the valve will not properly seat. Since any sidewise movement of the retaining valve is kept within very narrow limits, the valve in its closing movement will, due to its engagement with the valve seat, be self centering and the proper seating of the valve will be ensured.

Heretofore retaining valves have been provided with downwardly depending guide portions which extended into the central bore of the valve seat member for guiding the valve as it is operated, which construction has been found to be objectionable, in that, dirt will collect and oil will gum about the guide and will prevent the proper operation of the valve. In my present construction this cannot happen as the guide portion is omitted.

The valve stem 6, adjacent its upper end is reduced in diameter, forming spaced top and bottom annular stop shoulders 12 and 13 which are adapted to engage a pin 15, which has a driving fit with the barrel 5. Only one end of the pin is exposed and this end is peened over so that it is practically impossible to remove it. It will thus be seen that the pin 15 will maintain the barrel 5, stem 6, and spring 9 together as a unit. As the shoulders 13 and 14 are spaced apart, limited movement of the stem 6, relative to the barrel 5, is permitted.

To assemble the parts, the stem 6 with the spring 9 in place on the annular collar 8, is inserted in the barrel section 5 and is forced upwardly, compressing the spring 9 against the shoulder 10 sufficiently that the stop shoulder 12 on the stem 6 will be above the bore in the barrel section for the reception of the pin 15 when said pin is driven into the bore and the exposed end peened over. The stem 6 is now released and the pressure of the spring 9, acting on the collar 8 and the shoulder 10, causes the stem 6 and valve to move downwardly until the shoulder 12 engages and stops against the pin 15.

The barrel section 5 is of such length that when the shoulder 12 of the stem 6 is in engagement with the pin 15, the spring 9 and valve 7 will not be exposed beyond the end of the section and will thus be well guarded against damage at all times.

When the barrel section is in its operative position, the pressure of the spring 9 acting on the collar 8 tends to maintain the valve 7 seated. When the valve is thus seated, the shoulders 12 and 13 of the stem 6 will be out of engagement with the pin 15, the space between the shoulders and the pin being sufficient to permit the proper operation of the valve.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a pressure retaining valve device, the combination with a valve body having a valve seat, of a valve for engaging said seat, a barrel section adapted to be secured to said body, a stem for said valve, a spring in said barrel section acting on said stem, and means for holding said stem and thereby said spring entirely within said barrel section when said barrel section is removed from said valve body.

2. In a pressure retaining valve device, the combination with a valve body having a valve seat, of a valve for engaging said seat, a barrel section adapted to be secured to said body, a stem for said valve movably mounted in said barrel section, a spring acting on said stem, and means for preventing the separation of said barrel section, stem and spring, said means also preventing exposure of said spring beyond the end of said casing when said barrel section is removed from said valve body.

3. In a pressure retaining valve device, the combination with a valve body having a valve seat, of a valve for engaging said seat, a barrel section adapted to be secured to said body, a stem for said valve having spaced shoulders formed thereon, and a pin in said barrel section extending between said shoulders, said shoulders being adapted to engage said pin to limit the movement of said stem relative to said barrel section, and a spring held wholly within said section by said stem when said barrel section is removed from said valve body.

4. In a pressure retaining valve device, the combination with a valve body having a valve seat, of a valve for engaging said seat, a barrel section adapted to be secured to said body, a stem for said valve having spaced shoulders formed thereon, a pin in said casing for holding said stem in said barrel section, said pin passing between said shoulders and adapted to cooperate therewith to limit relative movement between said stem and barrel section, and a spring acting on said stem.

5. In a pressure retaining valve device, the combination with a valve body having a valve seat, of a valve for engaging said seat, a barrel section adapted to be secured to said body, a stem for said valve having spaced shoulders formed thereon, a pin in said barrel section adapted to be engaged by one of said shoulders for holding said stem in said barrel section, a spring acting on said stem, and means on said stem for holding said spring in said barrel section when said barrel section is removed from said valve body.

6. In a pressure retaining valve device, the combination with a valve body having a valve seat of a valve for engaging said seat, a barrel section removably secured to said valve body, a stem for said valve movably mounted in said barrel section, a spring in said barrel section acting on said stem, and means for holding said stem, spring and valve entirely within said barrel section when said section is removed from said valve body.

7. In a pressure retaining valve device, the combination with a valve body having a valve seat, of a valve for engaging said seat, a stem for said valve, and a collar on said stem normally out of engagement with said valve body adapted to engage said body to guide said valve to its seat, said valve being self centering on its seat.

8. In a pressure retaining valve device, the combination with a valve body having a valve seat, of a self centering valve for engaging said seat, a barrel section adapted to be secured to said body, a stem for said valve slidably mounted in said barrel section, a collar on said stem normally out of engagement with said barrel section adapted to engage said barrel section to guide said valve to its seat, and a spring engaging said collar and being guided by said stem for urging said valve toward its seat.

In testimony whereof I have hereunto set my hand.

CLYDE C. FARMER.